United States Patent [19]

Denham et al.

[11] 4,355,934
[45] Oct. 26, 1982

[54] SELF-PLUGGING BLIND RIVET

[75] Inventors: Keith Denham, Welwyn; Leslie R. Prickett; Lawrence R. Pallister, both of Stevenage, all of England

[73] Assignee: Aerpat A.G., Zug, Switzerland

[21] Appl. No.: 190,969

[22] Filed: Sep. 26, 1980

[30] Foreign Application Priority Data

Sep. 28, 1979 [GB] United Kingdom ............... 7933837

[51] Int. Cl.$^3$ .............................................. F16B 13/06
[52] U.S. Cl. ....................................... 411/38; 411/43
[58] Field of Search ..................... 411/38, 34, 43, 70, 411/59, 44

[56] References Cited

U.S. PATENT DOCUMENTS

| 3,072,009 | 1/1963 | Stau et al. | 411/43 |
| 3,276,308 | 10/1966 | Bergere | 411/43 |
| 3,426,375 | 2/1969 | Jeal | 411/43 X |
| 4,222,304 | 9/1980 | Yoshida et al. | 411/43 X |

FOREIGN PATENT DOCUMENTS

| 890037 | 2/1962 | United Kingdom | 411/43 |
| 1066033 | 4/1967 | United Kingdom | 411/43 |
| 1145124 | 3/1969 | United Kingdom | 411/43 |
| 1228781 | 4/1971 | United Kingdom | 411/70 |

Primary Examiner—Ramon S. Britts
Attorney, Agent, or Firm—Oblon, Fisher, Spivak, McClelland & Maier

[57] ABSTRACT

A self-plugging blind rivet (10) embodies lockingly interengageable members in the form of a headed tubular rivet body (12) with a bore (20) which reduces in diameter towards the head (18), and a mandrel (14) for setting the rivet. The mandrel (14) has a break-off stem (60) and a plug portion (62) which is left in the bore (20) of the rivet body (12) after setting the rivet. The plug portion (62) engages the end of the body (12) remote from the head (18) and has radially projecting longitudinal splines (102) which form grooves in the body (12) when pulled into the reduced diameter region (26) of its bore, and has a cylindrical swaging portion (84) which swages material of the body into parts of the grooves along which the splines (102) have passed so as to lock the plug (62) in the bore (20) and prevent its retraction from the set rivet. The rivet body (12) includes an axially collapsible shank (16) which forms a blind head when the mandrel (14) is pulled along the bore (20) and before the plug (62) becomes locked in the reduced diameter region (26).

14 Claims, 15 Drawing Figures

SELF-PLUGGING BLIND RIVET

This invention relates to self-plugging blind rivets. Self-plugging blind rivets are known in a variety of forms, and generally comprise a tubular rivet body and a mandrel which extends through the bore of the tubular body, the mandrel being pulled to expand the tubular body and thereby set the rivet, and at least a part of the mandrel acting as a plug which is left plugging the bore of the body of the set rivet, and which may serve to close the bore and/or strengthen the rivet.

Occasionally in use, the plug becomes loose or separated from the body of the rivet to the detriment of the rivet and possibly causing a hazard to structures with which the rivet may be associated.

A self-plugging blind rivet has now been devised, in which the plugging part of the mandrel and the rivet body are adapted to enter into locking engagement when the rivet is set whereby the risk of the plug subsequently becoming loosened or separated may be reduced.

According to the present invention, there is provided a self-plugging blind rivet comprising:

a tubular rivet body having a head at one end, an elongate shank which, can be expanded radially to form a blind head, and a bore throughout the head and shank, the bore having, in the vicinity of the head, a region having a reduced diameter;

and a mandrel disposed in the bore of the body, the mandrel having an elongate stem which projects from the head end of the bore of the body, a plug, and a breaker groove at the junction of the stem and plug;

the plug having an end portion remote from the stem which is adapted to enage a tail-end portion of the shank remote from the head of the body in a manner such as to cause radial expansion of the shank to form a blind head when the mandrel is pulled to move the plug relatively towards the head end of the body, the plug also having groove-forming means adjacent the breaker groove for forming one or more longitudinal grooves in the region of the body in which the diameter of the bore is reduced when the plug is moved longitudinally towards the head end of the body, and means spaced from the breaker groove by the groove-forming means for swaging material of the body into one or more of the grooves formed by longitudinal passage of the groove-forming means along the region of the bore which has a reduced diameter so as to close the groove or grooves behind the groove-forming means.

The groove-forming means may comprise one or more radially projecting splines integral with the plug. There may be a plurality of the splines arranged equi-angularly around the axis of the mandrel.

The means for swaging the material of the body into a groove or grooves may be in the form of a portion of the plug disposed to swage into the groove or grooves material displaced from the grooves by passage of the groove-forming means therealong.

The swaging means may be in the form of a cylindrical portion having a diameter intermediate between the diameters through which the groove-forming means projects.

The diameter of the bore in the region of reduced bore diameter may be reduced progressively. The diameter may be reduced stepwise. There may be more than one stepwise reduction in the diameter of the bore. The bore may have a locking region constituted by a first region of the bore in which the diameter is reduced and a second region in which the diameter of the bore is smaller than in the locking region and such as to substantially resist further passage of the groove-forming means therealong. The diameter throughout the locking region may remain constant.

The end portion of the plug may be shaped so as to exert a compressive force on the shank of the body when the mandrel is pulled. The end portion of the plug may be shaped so as to abut the end of the rivet body remote from the head. The end portion of the plug may be yieldably interengaged with the tail-end portion of the shank so as to yieldably resist axial movement of the plug relative to the tail-end portion in a direction towards the head.

The engagement between the end portion of the plug and the tail-end portion of the body may be provided by forming the plug and the body with interengaging projections and recesses. The interengagement may be provided by forming the end portion of the plug with peripheral ribs and grooves, and crimping the tail-end portion of the body into mating engagement with the ribs and grooves of the end portion of the plug.

A portion of the shank of the body intermediate between the tail-end portion and the region in which the diameter of the bore is such as to be grooved by the groove-forming means may be formed with longitudinally extending and circumferentially spaced regions of weakening such as to facilitate outward bending of struts forming the intermediate portion of the shank.

Embodiments of the Invention will now be described, by way of example, with reference to the accompanying diagrammatic drawings, in which:

FIG. 3 is a cross-section of the mandrel on the line III—III of FIG. 1;

FIG. 4 is a cross-section of the rivet body on the line IV—IV of FIG. 1;

FIGS. 5 to 9 are views similar to FIG. 2 but showing successive stages in the setting of the rivet in a workpiece by means of a suitable tool;

Figure 1:
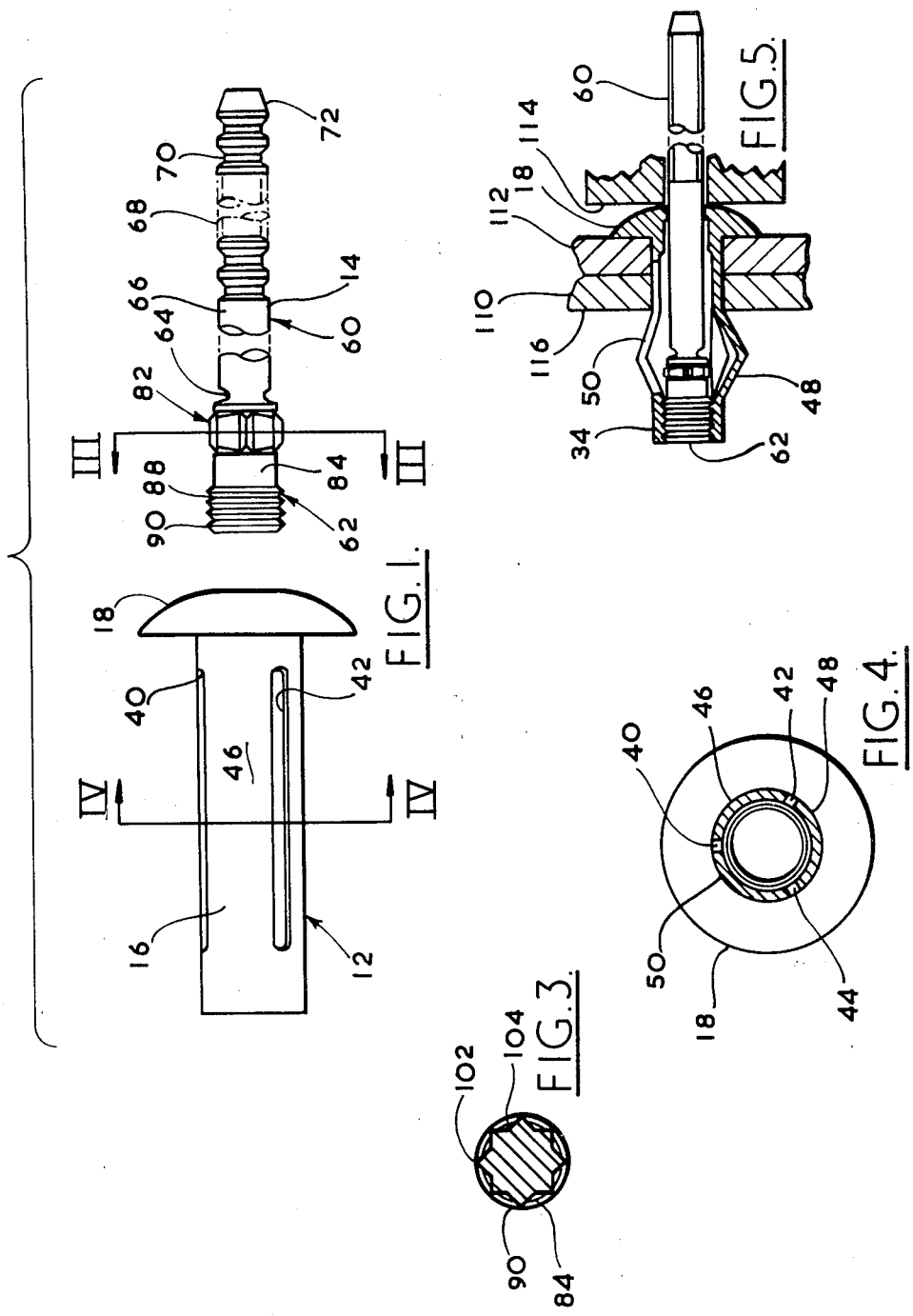
FIG. 1 is an elevational view showing a rivet body and a mandrel of a self-plugging blind rivet, prior to assembly.
Figure 2:
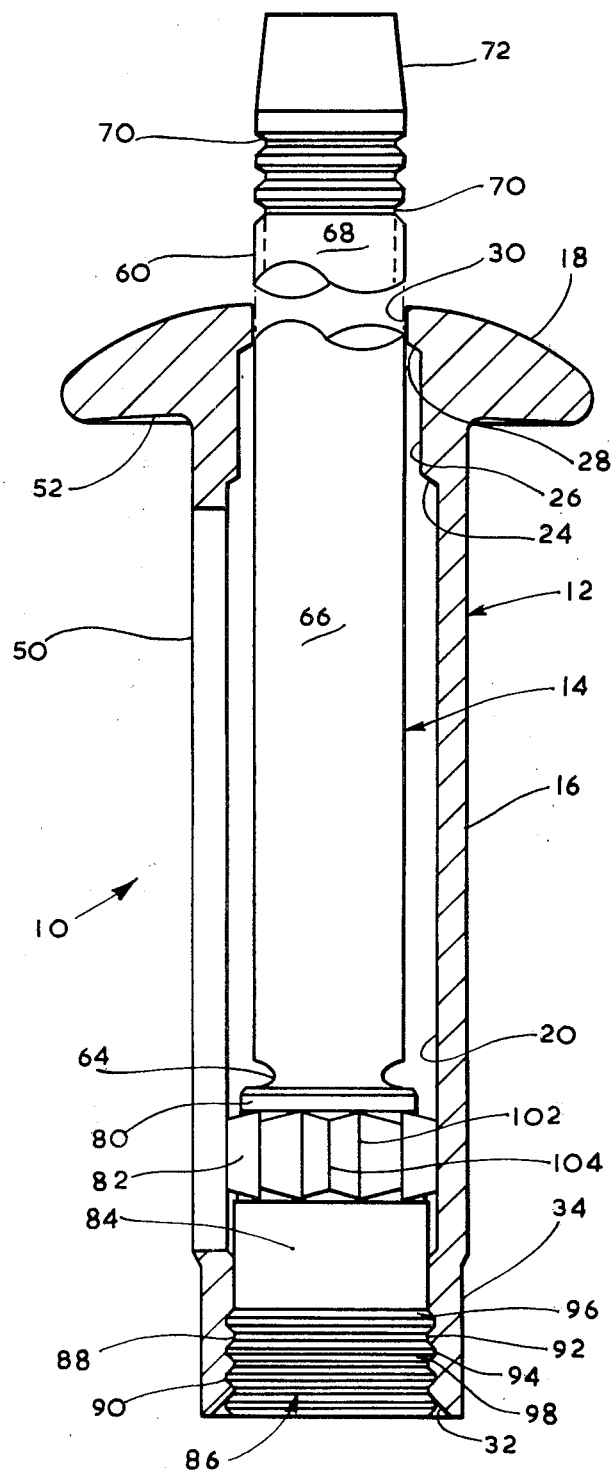
FIG. 2 is an elevational view of the assembled self-plugging blind rivet, showing the rivet body in section.

A self-plugging blind rivet 10 consists of two parts, namely, a tubular rivet body and a mandrel 14, both of which are shown, separately, in FIG. 1. Prior to use, the parts are assembled together to form a unitary structure as shown in FIG. 2.

The rivet body has an elongate shank 16 and a radially enlarged head 18 formed integrally with the shank at one end (the "head-end") of the body. A bore 20 extends completely throughout the length of the head and shank of the body. The diameter of the bore is reduced progressively in the region of the head 18 by means of two separate stepwise reductions, the first reduction being in the form of a steep taper towards the head-end which provides a frusto-conical shoulder 24 and leads to a locking region 26 of constant diameter. The locking region 26 extends into the head 18 as far as the region of the second reduction in diameter. The second reduction in diameter is also in the form of a steep taper towards the head-end and provides a second frusto-conical shoulder 28 leading to a terminal region 30 of the bore 20. The terminal region 30 is of constant diameter and extends to the head-end of the body 12. It will be appreciated that the two shoulders 24,28 both face generally towards the end of the shank remote from the head, (that is to say, the "tail-end").

Prior to assembly of the body 12 and mandrel 14, the external surface of the shank 16 is cylindrical, and the region of the bore 20 between the tail-end of the body and the shoulder 24 is of constant diameter except for a short, steeply flared lead-in 32 at the tail-end.

During assembly of the body and mandrel, however, the mandrel is inserted into the bore 20, and a portion 34 of the shank adjacent to the tail end and spaced from the first shoulder 24 is crimped circumferentially so as to reduce both the external diameter and the internal diameter of the bore 20 of the shank in the tail-end portion and thereby cause the mandrel to be gripped by the tail-end portion 34 of the shank as will be more fully explained hereinafter.

The shank of the body is formed with three longitudinally extending areas of weakening in the form of elongate openings or slots 40, 42 and 44 which are spaced equiangularly around the shank. Each slot extends from a position a little nearer to the tail-end of the body than the shoulder 24 to a position which is spaced from the tail-end of the body by the crimped tail-end portion 34.

The portion of the shank which is longitudinally traversed by the slots is hereinafter referred to as the "intermediate portion" of the shank and is formed by three longitudinal struts 46,48 and 50 which are circumferentially spaced from each other by the slots.

The head 18 of the body in this embodiment is of the round-head type and has concavely dished under-head surface 52.

The mandrel 14 is of the break-stem type, comprising an elongate stem 60, a plug 62, and a breaker groove 64 which demarcates the stem from the plug leaving a breakneck which is the weakest portion of the mandrel so that, when the mandrel is subjected to tension, it will break at the breaker groove rather than elsewhere. The stem 60 of the mandrel is appreciably longer than the rivet body 12 and has a plain cylindrical portion 66 immediately adjacent to the breaker groove, a grooved portion 68 formed with a plurality of pulling grooves 70 and extending over the greater part of the length of the stem, and a terminal tapered lead-in 72 at the end remote from the plug 62. The pulling grooves 70 allow the stem to be gripped firmly and pulled by means of a suitable riveting setting tool.

The maximum diameter of the stem 60 is such that the entire stem is able to pass with clearance through the terminal region 30 of the bore of the rivet body.

The plug 62 of the mandrel has, immediately adjacent to the breaker groove, a short cylindrical portion 80, next to which is a splined locking portion 82. The axial length of the cylindrical portion 80 is approximately half that of the terminal region 30 of the bore, although it could be of a greater length not exceeding that of the terminal region. The axial length of the splined locking portion 82 is less than the axial length of the locking region 26 of the bore.

Adjacent to the locking portion 82, the plug has a cylindrical swaging portion 84 which is a clearance fit in the region of the bore 20 within the intermediate portion of the shank of the rivet body.

The plug has an end portion 86 remote from the breaker groove formed with a plurality of annular grooves 88 which alternate with annular ridges 90. In this embodiment there are five of the grooves 88 and four ridges 90. The number is not of particular significance: more important is the fact that, during assembly of the body and mandrel, the mandrel is inserted into the bore 20, stem first, from the tail-end of the body so that the plug end of the mandrel lies flush with the tail-end of the body and the stem projects from the head-end of the body and the ridged and grooved end portion 86 of the plug lies within the tail-end portion 34.

The tail-end portion 34 of the body is then crimped on to the end portion 86 of the plug with sufficient force to cause material of the shank to enter into the grooves between the ridges and thus mould the internal surface of the tail-end portion to a greater or lesser degree into mating conformity with the ridged and grooved configuration of the end portion of the plug. Thus, the tail-end portion of the shank becomes formed with ridges and grooves which interengage those of the plug, and the mandrel is retained in the bore 20 in a manner which requires the application of considerable axial force to overcome the interengagement between the ridged and grooved portions. The actual force required to overcome the interengagement can be varied within limits by controlling the extent of interengagement produced by the crimping operation. Thus, if the body is heavily crimped so as to force material fully into the depth of the grooves 88, the force required to overcome the interengagement will be at a maximum, whereas if the body is more lightly crimped so that the grooves 88 are not entirely filled, a lesser force will be required.

The mandrel may be formed from a cylindrical blank, conveniently by a rolling operation analogous to thread rolling, and in doing so the grooves are rolled into the end portion of the plug so that the root diameter of the grooves is smaller than the diameter of the swaging portion 84 and material displaced from the grooves contributes to the formation of the ridges 90. The ridges have a diameter such that the plug can be inserted into the bore of the body, prior to the crimping of the body.

Each groove 88 has a substantially flat root 92. Each ridge 90 has a flat crest 94 and sloping flanks 96,98 each arranged at an angle of about 45° to the axis of the mandrel, the flank 96 facing generally towards the stem of the mandrel and the flank 98 facing generally away from the stem so that the two flanks are inclined to each other at an included angle of 90°.

The splined portion 82 of the plug is formed with, in this embodiment, eight, splines 102 arranged circumferentially and equi-angularly spaced about the axis of the plug and defining, between adjacent splines, V-shaped longitudinal grooves 104. The splines are straight and parallel to the axis of the mandrel. The axially opposite ends of each spline taper towards each other away from the mandrel axis at at angle of 45°.

The splined portion 82 of the plug has a minor diameter, taken across the roots of diametrically opposite grooves 104, which is less than the diameter of the locking region 26 of the bore of the body, and a major diameter, taken across the crests of diametrically opposite splines 102, which is greater than that of the locking region 26 and less than the diameter of the bore in the region within the intermediate portion of the shank so that the splined portion is either a sliding or clearance fit in the intermediate portion. The diameter of the cylindrical swaging portion 84 is intermediate between the root and crest diameters of the splined portion of the plug.

The use of the assembled rivet 10 to fasten together apertured workpiece members will now be described.

Thus, an apertured panel member 110 which may be of a soft or easily fractured material such as glass fibre reinforced plastics material may be fastened to another apertured member 112 which may, for example, be a metallic support member for the panel, by bringing the members together with their apertures in register and inserting the shank of the rivet through the apertures until the head 18 abuts the member nearer the operator, and the tail-end portion 34 and at least part of the slotted intermediate portion of the shank projects beyond the further member of the workpiece.

A rivet setting tool comprising means for gripping and pulling the part of the mandrel stem which projects from the head of the rivet body, and an annular anvil 114 for abutting the head of the rivet is offered up to the rivet so that the stem passes through the anvil into engagement with the gripping and pulling means, and the anvil abuts the rivet head. The tool is then operated to pull the mandrel axially relative to the rivet body, in a direction to draw the plug 62 towards the head 18 of the body.

Figure 6:
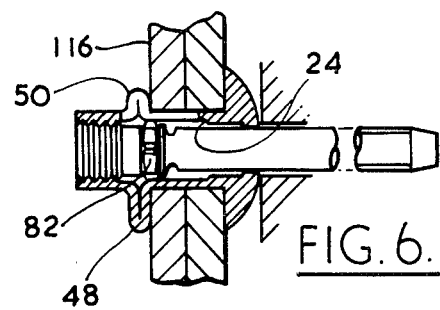

Due to the interengagement between the crimped tail-end portion 34 of the body and the grooved end portion 86 of the plug, the tail-end portion 34 begins to move with the mandrel towards the rivet head 18, accompanied by an outward bending of the three struts 46,48 and 50 which occurs, as shown in FIG. 5, at a point generally half-way between the distal face (indicated by reference 116) of the panel 110 and the tail-end portion of the rivet body. This movement of the tail-end portion 34 with the mandrel continues until the three struts are bent double and forced firmly into abutment with the distal face 116, as shown in FIG. 6, so as to constitute a blind head of greater transverse dimension than the apertures of the workpieces.

At this stage, the force required to move the tail-end portion nearer to the head 18 increases abruptly to the extent that on applying sufficient force the interengagement between the end portion of the plug and the tail-end portion of the body is overcome and yields and the plug is stripped out of engagement with the tail-end portion.

The mandrel then moves freely along the bore of the body until the splines 102 come into abutment with the first shoulder 24 at which the diameter of the bore is reduced to less than the major diameter of the splined portion 82.

Figure 7:
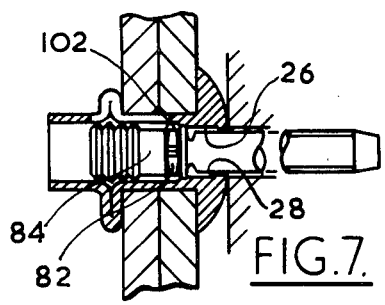

Continued pulling of the mandrel by the tool then causes the splines 102 to be forced into the material of the shank peripherally of the locking region 26 of the bore, displacing some of the material of the shank so as to form V-shaped grooves which extend longitudinally from the shoulder 24 towards the head end, and also forming corresponding longitudinal ridges of displaced material. This stage is illustrated in FIG. 7.

Figure 8:
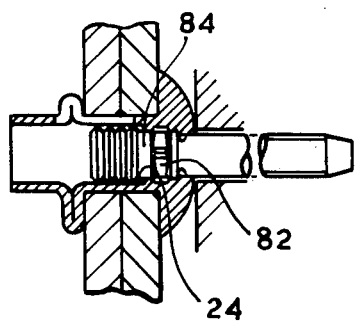

Before the splines reach the second shoulder 28 however, the swaging portion 84 of the plug begins to enter the locking region 26 of the bore and, as it does so, it swages the material of the shank peripherally of the locking region so as to fill in the parts of the V-shaped grooves left by the splines which by now have passed beyond the region being traversed by the swaging portion. This stage is illustrated in FIG. 8.

Eventually the splines reach the second shoulder 28 at which the diameter of the bore is further reduced to an extent such that the force required to move the splined portion further abruptly increases again.

Figure 9:
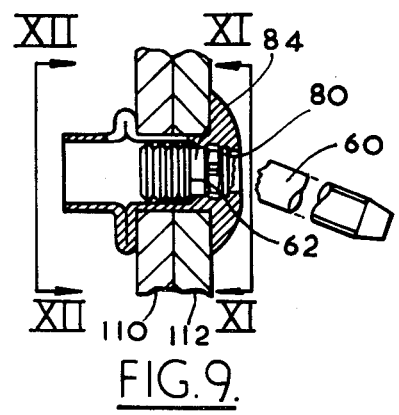
Figure 10:
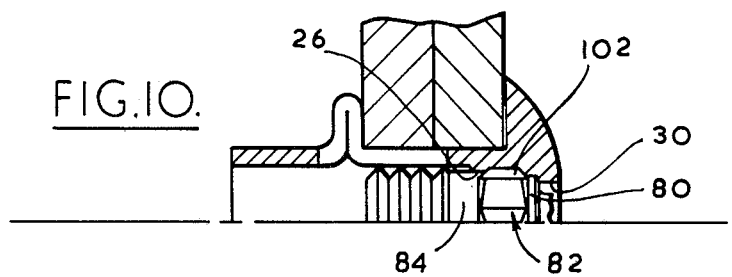
FIG. 10 is an enlarged fragmentary sectional elevation corresponding to FIG. 9.
Figure 11:
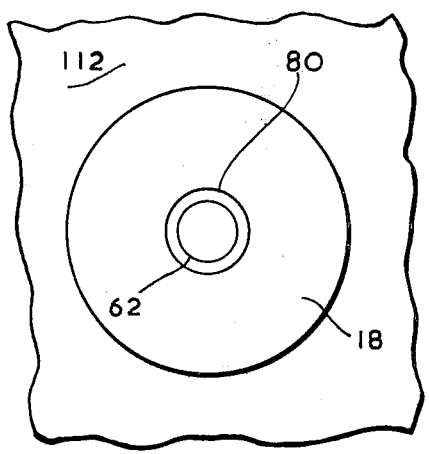
FIG. 11 is an elevational view of the set rivet in the direction of arrows XI—XI of FIG. 9.
Figure 12:
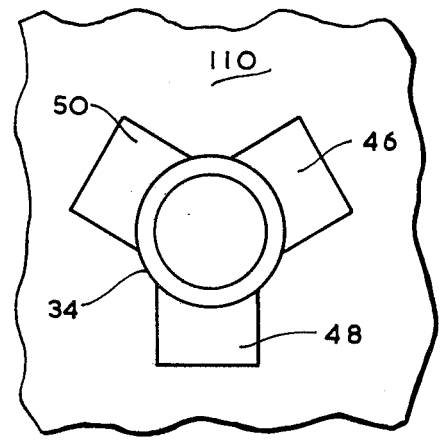
FIG. 12 is an elevational view of the set rivet in the direction of the arrows XII—XII of FIG. 9.

The depth of the breaker groove is arranged to be such that the mandrel breaks at the breaker groove when this force is applied, and so application of the requisite further force causes the stem 60 to break off, as illustrated in FIG. 9, leaving the plug locked in the bore, with the splines bedded in the grooves which they have formed and which grooves have been closed behind the splines by the action of the swaging portion 84. It will therefore be appreciated that a very considerable force would be required to dislodge the plug from the position into which it is drawn during the setting operation, and it can therefore be relied upon to remain in position and augment the shear strength of the rivet body in the region between the workpiece members.

The cylindrical portion 80 of the plug is an interference fit in the terminal region 30 of the bore but of greater diameter than the stem 60. Consequently the cylindrical portion provides a neat appearance to the plug peripherally of the fracture after the mandrel has broken at the breaker groove. The cylindrical portion 80 may also serve to abut an anvil of appropriate dimensions so as to provide a reaction against the pulling force applied by the tool during setting of the rivet, and thus may enable the forces required to break the mandrel to be absorbed almost entirely in the tool and mandrel, (rather than in the rivet body as well,) so that there is no risk of damaging the set fastener.

Figure 13:
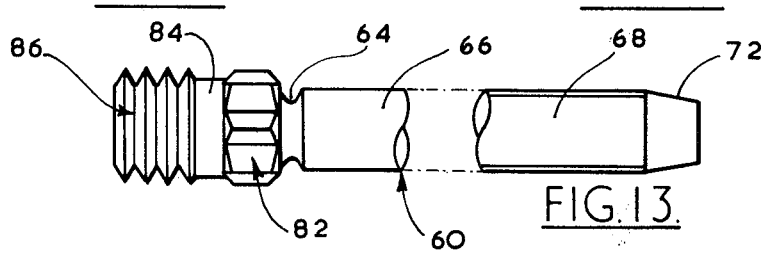
FIG. 13 is an elevation of a mandrel forming part of a second embodiment of the invention.
Figure 14:
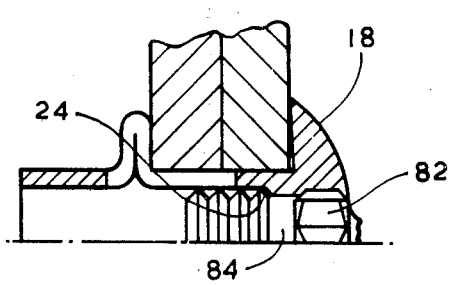
FIG. 14 is a view corresponding generally to that of FIG. 10 but showing the second embodiment in the set condition.
Figure 15:
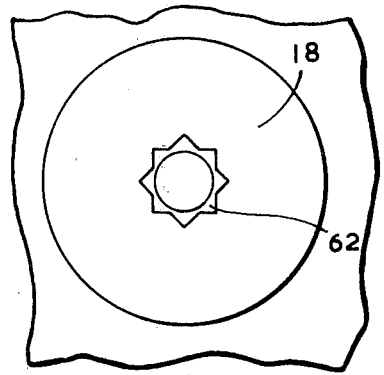
FIG. 15 is an end elevation of the second embodiment in the set condition.

The cylindrical portion 80 is not essential, however, as the splined portion 82 may be formed immediately adjacent to the breaker groove as shown in FIG. 13, but there is then a possibility that the splines may be pulled through the terminal region 30 of the bore and become visible at the head end of the body, giving a less aesthetically desirable appearance to the set rivet.

The number of splines provided in the splined portion of the mandrel is not critical since it will be apparent that as few as one spline would have some locking effect. It is, however, preferred that there be at least three of the splines, spaced substantially equi-angularly, in order that they may exert a centralising effect upon the portion of the mandrel in the bore of the body.

The form of the body may be modified in various ways. In particular, instead of having three struts 46,48,50 there could be only two or a greater number, for example six, made by appropriately varying the number of slots. Furthermore, instead of material of the shank being punched out to form the slots, 40,42,44, the material could merely be partly sheared out, leaving tongues occupying the slots. Such tongues could remain attached to the shank at one or both of their ends. Alternatively the shank could merely be formed with longitudinal shear lines or grooves so as to provide longitudinal weakening of the intermediate portion of the shank such as to enable it, on being compressed axially, to split into a plurality of longitudinal struts which can be bent or bowed outwardly until doubled and thereby form a radially enlarged blind head.

The means by which, in the foregoing embodiment, the formation of a blind head is achieved during setting of the rivet and by which the plug is enabled to become disengaged from the tail-end portion of the rivet body may also be modified. A number of suitable solutions have been proposed in the past in connection with pull-to-set self-plugging blind rivets. However it is believed that the solution to this problem offered by the preferred embodiment offers advantages in that on the one hand it facilitates good control over the different forces required at different stages of the setting operation and on the other hand it enables a single size of rivet to be versatile in the range of thickness of workpiece (i.e. "grip range") which can be accommodated.

We claim:
1. A self-plugging blind rivet comprising:
a tubular rivet body having a head at one end, an elongate shank which can be expanded radially to form a blind head, and a bore throughout the head and shank;
and a mandrel disposed in the bore of the body, the mandrel having an elongate stem which projects from the head end of the bore of the body, a plug, and a breakneck joining the stem and plug;
the plug having an end portion remote from the stem which is adapted to engage a tail-end portion of the shank remote from the head of the body in a manner such as to cause radial expansion of the shank to form a blind head when the mandrel is pulled to move the plug relatively towards the head end of the body, wherein the diameter of the bore of the body is reduced progressively towards the head to provide a locking region in the vicinity of the head, and the plug has axially-extending groove-forming means adjacent the breakneck having a maximum diameter greater than that of the locking region for forming one or more longitudinal grooves in the locking region of the body when the plug is moved longitudinally towards the head end of the body and swaging means spaced from the breakneck by the groove-forming means having a diameter greater than that of said locking region but less than the maximum diameter of the groove-forming means for swaging material of the body into one or more of the grooves formed by longitudinal passage of the groove-forming means along the locking region of the bore so as to close the groove or grooves behind the groove-forming means.

2. A self-plugging blind rivet according to claim 1, wherein the groove-forming means comprises one or more radially projecting splines integral with the plug.

3. A self-plugging blind rivet according to claim 1, wherein the groove-forming means comprises a plurality of radially projecting splines arranged equiangularly around the axis of the mandrel.

4. A self-plugging blind rivet according to claim 1, wherein the swaging means is in the form of a portion of the plug disposed to swage into the groove or grooves material displaced from the grooves by passage of the groove-forming means therealong.

5. A self-plugging blind rivet according to either of claims 1 or 3 wherein the swaging means is in the form of a cylindrical portion.

6. A self-plugging blind rivet according to claim 1, wherein the diameter of the bore is reduced stepwise to provide the said locking region.

7. A self-plugging blind rivet according to claim 1, wherein the bore has more than one stepwise reduction in diameter.

8. A self-plugging blind rivet according to claim 1, wherein the bore has a first region of reduced but constant diameter providing the said locking region and a second region, nearer the head than the locking region.

9. A self-plugging blind rivet according to either of claim 8, wherein the plug has a cylindrical portion between the groove-forming means and the breakneck, the cylindrical portion having a diameter greater than that of the stem of the mandrel and less than that of the plug in the region of the groove-forming means.

10. A self-plugging blind rivet according to claim 9, wherein the cylindrical portion is a push-fit in the second region of the bore.

11. A self-plugging blind rivet according to claim 1, wherein the plug has an end portion shaped so as to exert a compressive force on the shank of the body when the mandrel is pulled.

12. A self-plugging blind rivet according to claim 1, wherein the plug has an end portion remote from the breakneck, which end portion is yieldably interengaged with the tail-end portion of the shank so as to resist axial movement of the plug relative to the body in a direction towards the head until a blind head has been formed, and then to yield.

13. A self-plugging blind rivet according to claim 12, wherein the said end portion of the plug is disposed within the bore of the tail-end portion and the interengagement is provided by interengaging projections and recesses of both the end portion of the plug and the tail-end portion of the body.

14. A self-plugging blind rivet according to claim 1, wherein the shank has a plurality of longitudinally extending areas of weakening in a region between the tail-end portion and the locking region to facilitate formation of a blind head.

* * * * *